Dec. 3, 1968     D. R. HENRY     3,413,750

LIGHT DIFFRACTION FISHING LURE

Filed April 11, 1966

INVENTOR.
DANA R. HENRY
BY *Naylor & Neal*
ATTORNEYS

United States Patent Office 3,413,750
Patented Dec. 3, 1968

3,413,750
LIGHT DIFFRACTION FISHING LURE
Dana R. Henry, 320 Lee St., Apt. 1204,
Oakland, Calif. 94610
Filed Apr. 11, 1966, Ser. No. 541,622
5 Claims. (Cl. 43—42.33)

ABSTRACT OF THE DISCLOSURE

A fishing lure having a clear, transparent, watertight, flexible envelope containing therein a flexible diffraction grating sheet, the envelope and grating sheet being concavo-convex in form and being pivotally mounted on a beaded leader.

---

The present invention relates to an improved fishing lure, and more particularly, is directed to such a lure of the spoon type incorporating a diffraction grating to break light waves into prismatic colors especially enticing to fish.

In the prior art, various types of fishing lures incorporating reflective surfaces to entice fish have been provided. These surfaces have been colored, polished, and faceted to obtain reflective characteristics thought to be attractive to fish. The surfaces thus provided have not, however, been provided with diffraction gratings to break light waves into prismatic colors. Thus, such lures have been quite limited in the fish enticing color patterns presented thereby.

Diffraction gratings have traditionally been very expensive to fabricate due to the fine precision grating lines required in diffraction surfaces. As a result, in past years, diffraction gratings have been employed primarily for scientific purposes. It has now become possible, however, to produce diffraction grating "replicas" on plastic sheet material at a relatively low cost. These replica gratings have enjoyed commercial application for various ornamental purposes.

Replica diffraction gratings of the aforementioned type are characterized in that they are formed on thin, flexible plastic sheets readily susceptible to damage. For example, if not handled with care, such sheets may be abraded, torn, or deformed to a degree substantially impairing their diffraction qualities. Where these sheets are provided with an aluminized coating for reflective purposes, this coating is also readily susceptible to such damage. The sheet characteristic of these replica gratings also renders them highly flexible and susceptible to elastic deformation upon being subjected to external forces, such as fluid pressure.

It is, accordingly, a principal object of the present invention to provide a spoon type fishing lure incorporating thereinto a replica diffraction grating in such a manner that the grating effectively breaks light waves into prismatic colors. With respect to this object, it is a related object of the invention to provide such a lure capable of protecting the replica grating from deteriorating elements and adverse deformation.

Another object of the invention is to provide a spoon type fishing lure incorporating thereinto a replica diffraction grating which is maintained at a predetermined degree of curvature.

Yet another object of the invention is to provide a spoon type fishing lure having incorporated thereinto a diffraction grating sheet with reflection grating surfaces on each side thereof which are, respectively, visible from opposed sides of the lure.

A further object of the invention is to provide a spoon type fishing lure having incorporated thereinto a diffraction grating and including novel means to effect pivotal attachment thereof to a fishing leader.

In its broader aspects, the lure of the present invention comprises: a water impervious transparent sheet of spoon-shaped planar configuration; a diffraction grating sheet having a reflection grating surface on at least one side thereof; attachment means securing the grating surface of the grating sheet in juxtaposition to the transparent sheet so as to be visible therethrough and isolated from water intrusion thereby; and, a leader securing device operatively associated with the transparent sheet to provide for the pivotal attachment thereof to a fishing leader. The detailed construction of the lure and the foregoing and other objects will become more apparent when viewed in light of the following description and accompanying drawings, wherein:

Figure 1:
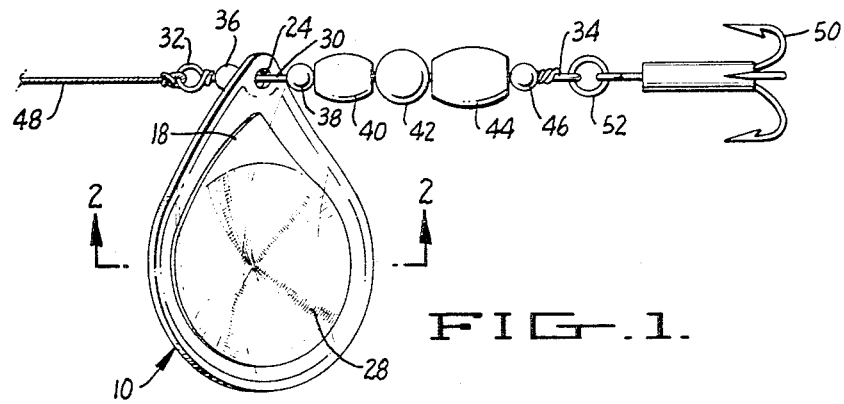
FIG. 1 is an elevational view illustrating the inventive lure attached to a leader of conventional nature.
Figure 2:
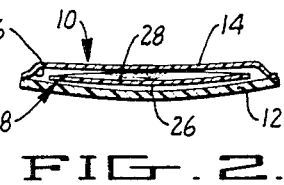
FIG. 2 is a sectional view taken on the plane designated by the line 2—2 in FIG. 1.

Referring now specifically to the drawings, the numeral 10 therein designates the inventive spoon type lure in its entirety. The lure 10 comprises: an outwardly convex water impermeable transparent sheet 12 of spoon-shaped configuration; an inwardly concave water impermeable transparent sheet 14 of spoon-shaped configuration sealingly secured peripherally to the sheet 12 to define therewith a watertight envelope 16; a replica diffraction grating sheet 18 contained in the envelope 16; and, a pair of aligned apertures 20 and 22, respectively, extending through the sheets 12 and 14 and sealingly secured peripherally to each other to define a hole 24 extending sealingly through the sheets 12 and 14 and the envelope 16 defined thereby. The grating sheet 18 is of the reflective type and has grating surfaces 26 and 28 on opposite sides thereof facing the sheets 12 and 14, respectively. The surfaces 26 and 28 are visible through the sheets 12 and 14, respectively, and isolated from water intrusion thereby.

In the condition illustrated in FIG. 1, the lure 10 is shown with the securing hole 24 thereof threaded over a leader 30 of relatively conventional nature. The leader 30 has loops 32 and 34 formed at the opposite ends thereof and beads threaded thereon between the loops. The beads are also of conventional nature and include bearing beads 36 and 38 to either side of the lure 10 and spacer beads 40, 42, 44, and 46 interposed between the bead 38 and the loop 34. A fishing line 48 is tied directly to the loop 32 and a hook 50 is secured to the loop 34 by a ring 52.

Figures 4, 5, 6:
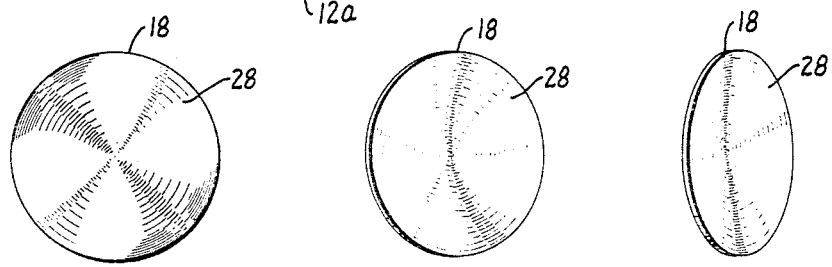

As noted in the foregoing discussion, the sheets 12 and 14 are convex outwardly and inwardly, respectively. Through this characteristic, the envelope 16 has a convexo-concave characteristic and, thus, maintains the grating sheet 18 in a similar curvature. Curvature of the grating sheet has the advantage that it enhances the light diffracting characteristics of its grating surfaces. This is especially true where the grating surfaces are formed with spiral grating lines, as shown in the illustrated embodiment. In FIGS. 4, 5, and 6, the appearance created by the concave grating surface 28 of the sheet 18 as it turns is exemplified. Specifically, these figures illustrate the surface 28 as it turns from a planar position facing the viewer in FIG. 4 to positions in FIGS. 5 and 6 where the left-hand edge of the surface is progressively nearer to the viewer than the right-hand edge. A progressive sequence of this type is typical of that which would appear to a viewer fish as relative movement occurred between it and the grating sheet.

Figure 3:
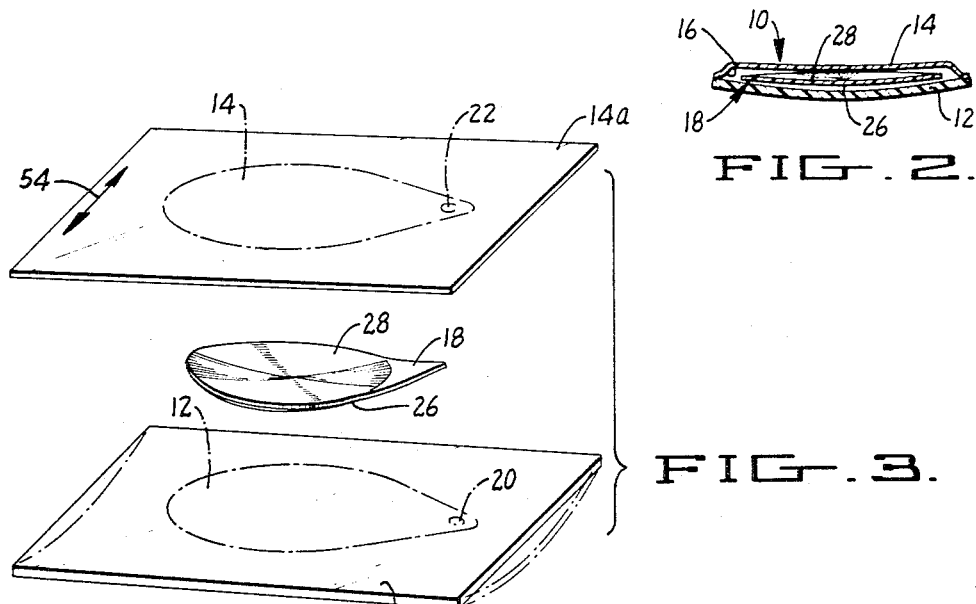
FIG. 3 is an exploded perspective view illustrating the manner in which the preferred embodiment of the inventive lure is fabricated; and, FIGS. 4, 5 and 6 are views illustrating the diffraction grating incorporated into the inventive lure at different angular orientations relative to the viewer.

FIG. 3 illustrates a preferred technique for peripherally securing the sheets 12 and 14 together to define a convexo-concave envelope 16 therebetween containing the grating sheet 18. In this technique, the sheets 12 and 14 are initially over-sized, as represented by the numerals 12a and 14a, respectively. The over-sized sheet 12a is formed of relatively thick, planished vinyl (e.g. .040 inch thickness) having no molecular orientated "grain." The over-sized sheet 14a is formed of thinner, calendered vinyl (e.g. .012 to .015 inch thickness) having a molecular orientated "grain" extending transversely thereto, as indicated by the arrow line 54. The sheet 12a is characterized in that it does not appreciably distort when raised in temperature to 250° F. The calendered sheet is characterized in that, upon being raised in temperature to approximately 250° F., it undergoes a shrink of approximately seven percent lengthwise of its grain while, simultaneously, expanding transversely of the grain. It is here noted that the sheets 12a and 14a are of relatively flexible nature and typically formed of a material such as polyvinyl chloride. The diffraction grating sheet 18 is typically formed of an acetate material.

In practicing the technique exemplified in FIG. 3, the diffraction grating sheet 18 is sandwiched between the sheets 12a and 14a with the grain of the sheet 14a extending substantially normal to the lengthwise dimension of the spoon to be formed. After the sheets are so orientated, they are compressed between sealing and cutting dies to effect, simultaneously: cutting of the spoon-shaped sheets 12 and 14 from the over-sized sheets 12a and 14a, respectively; peripheral sealing and securing of the sheets 12 and 14 to each other to thus define therebetween the watertight envelope 16; and, forming and peripheral sealing of the apertures 20 and 22 to define a sealed hole 24 extending through the sheets 12 and 14. Once the sheets 12 and 14 have been thus prepared and sealingly secured together peripherally, they are subjected to a heat of approximately 250° F. to effect the aforedescribed distortion of the material forming the sheet 14. Upon this occurrence, the side edges of the sheet 12 are pulled inwardly by the sheet 14 and, thus, the lure assumes the convexo-concave shape. The sealing and cutting and the heating steps of the exemplified technique may be accomplished by any of the methods well known to those skilled in the art. It is also anticipated that the technique may employ large transparent and diffraction grating sheets and that equipment may be provided to simultaneously form a plurality of lures from such sheets.

From the foregoing detailed description, it is believed apparent that the present invention enables the accomplishment of the objects initially set forth herein. Special emphasis is here again made to the fact that the diffraction grating employed in the inventive lure breaks light waves into prismatic colors especially enticing to fish. This action is enhanced by the distortion of the dffraction grating into convexo-concave form which appears to emphasize the reds and purples diffracted therefrom.

What is claimed is:
1. A spoon type fishing lure comprising:
 (a) a water impervious transparent sheet of flexible material and spoon-shaped configuration;
 (b) a diffraction grating sheet of flexible material having a reflection grating surface on at least one side thereof; and
 (c) attachment means securing the grating surfaces of said grating sheet in juxtaposition to said transparent sheet so as to be visible therethrough and isolated from water thereby, said sheets being concavo-convex in form.

2. A lure according to claim 1, wherein said attachment means comprises a water impervious sheet of flexible material and spoon-shaped configuration sealingly secured peripherally to the first mentioned water impervious sheet to define therewith a watertight envelope containing said grating sheet, said envelope and said grating sheet being concavo-convex in form.

3. A lure according to claim 2, wherein
 (a) the second mentioned water impervious sheet is transparent; and
 (b) said grating sheet has reflection grating surfaces on both sides thereof.

4. A lure according to claim 3, wherein the grating surfaces of said grating sheets are formed with spiral diffraction lines.

5. A lure according to claim 3, wherein:
 (a) the second mentioned water impervious sheet is of spoon-shaped configuration having at least one transverse dimension slightly less than the corresponding transverse dimension of the first mentioned water impervious sheet; and,
 (b) said second mentioned sheet functions to pull the peripheral edges of said first mentioned sheet towards each other along said corresponding transverse dimension to thus bend said first mentioned sheet convexly outwardly and said second sheet concavely inwardly.

References Cited

UNITED STATES PATENTS

| | | | |
|---|---|---|---|
| 2,206,274 | 7/1940 | Wiberg | 43—42.33 X |
| 2,708,806 | 5/1955 | Siebert | 43—42.33 |
| 2,875,543 | 3/1959 | Sylvester et al. | 161—34 |
| 2,951,308 | 9/1960 | Kent | 43—42.33 |
| 3,122,853 | 3/1964 | Koonz et al. | 43—42.33 X |

WARNER H. CAMP, *Primary Examiner.*